United States Patent [19]

DelDonno

[11] Patent Number: 5,191,029
[45] Date of Patent: Mar. 2, 1993

[54] PHOSPHORUS-CONTAINING POLYMER COMPOSITIONS CONTAINING WATER-SOLUBLE POLYVALENT METAL COMPOUNDS

[76] Inventor: Theodore A. DelDonno, 3142 Taft Rd., Norristown, Pa. 19403

[21] Appl. No.: 749,627

[22] Filed: Aug. 19, 1991

Related U.S. Application Data

[63] Continuation of Ser. No. 569,263, Aug. 17, 1990, abandoned, which is a continuation of Ser. No. 291,816, Dec. 28, 1988, abandoned.

[51] Int. Cl.$^5$ ............................................. C08F 8/42
[52] U.S. Cl. ................................. 525/366; 524/547;
525/326.1; 525/330.3; 525/370; 525/371
[58] Field of Search ............ 525/326.1, 330.3, 366, 525/370, 371; 524/547

[56] References Cited

U.S. PATENT DOCUMENTS

| | | | |
|---|---|---|---|
| 2,754,280 | 7/1956 | Brown | 117/148 |
| 3,322,734 | 5/1967 | Rees | 260/79.3 |
| 3,449,303 | 6/1969 | Caldwell et al. | 260/80.71 |
| 3,740,366 | 6/1973 | Sanderson et al. | 260/29.6 |
| 4,043,952 | 8/1977 | Ganslaw et al. | 525/370 |
| 4,110,285 | 8/1978 | Pons et al. | 260/29.6 |
| 4,264,363 | 4/1981 | Cech | 325/112 |
| 4,467,071 | 8/1984 | Dawdy | 106/14.28 |
| 4,477,623 | 10/1984 | Pons et al. | 524/710 |
| 4,506,057 | 3/1985 | Greene et al. | 524/461 |
| 4,658,003 | 4/1987 | Schmidt et al. | 526/278 |

FOREIGN PATENT DOCUMENTS

| | | |
|---|---|---|
| 0221498 | 5/1987 | European Pat. Off. |
| 61-143411 | 7/1986 | Japan |
| 958856 | 5/1964 | United Kingdom |

*Primary Examiner*—Bernard Lipman
*Attorney, Agent, or Firm*—Brian W. Stegman

[57] ABSTRACT

Polymer compositions comprising a) one or more polymer(s) containing pendant and/or terminal phosphorus groups and b) one or more water-soluble polyvalent metal compound(s) functioning as a crosslinking agent are useful in coatings to give improved solvent resistance, chemical resistance, print resistance, corrosion resistance and adhesion to metal.

11 Claims, No Drawings

PHOSPHORUS-CONTAINING POLYMER COMPOSITIONS CONTAINING WATER-SOLUBLE POLYVALENT METAL COMPOUNDS

This application is a continuation of application Ser. No. 569,263, filed Aug. 17, 1990 now abandoned which is a continuation of application Ser. No. 291,816, filed Dec. 28, 1988 now abandoned.

BACKGROUND OF THE INVENTION

Air-dried coatings based on aqueous polymeric emulsions are widely used in industrial applications. It is known that the properties of these polymers can be modified by bonding metals to the polymer molecules. Bonding the metal to the polymer is typically attained by the formation of ionic bonds. In ionic bonding, the metals are usually bonded to an ionic group in the polymer such as a carboxylic acid group. The ionically bonded polymers, however tend to lose their structural stability in polar solvents, such as water or alcohol, and at high temperatures. Thus, polymeric coatings and adhesives which are crosslinked through ionic bonding are subject to attack and deterioration by chemical solvents, moisture and by thermal degradation.

Polymeric compositions which are ionically cross-linked are disclosed in U.S. Pat. Nos. 3,740,366; 3,322,734; and 2,754,280. The '366 patent teaches pressure sensitive adhesives ionically crosslinked by a polyvalent metal and free carboxylic acid groups. The '734 patent teaches ionically crosslinked copolymers containing ionized carboxyls or ionized sulfonyls and metal ions as an ionic linking agent. The '280 patent disclosed emulsions of ionically cross-linked resins wherein pairs of carboxyl groups in the molecular chains are crosslinked by atoms of polyvalent metals.

The prior art compositions based on carboxyl/-polyvalent metal cross-linking have disadvantages in many properties such as solvent resistance, print resistance, block resistance, storage stability and adhesion. Attempts have been made to improve the properties of polymeric coating and adhesive compositions by incorporating therein phosphorous-containing polymers.

British Patent Specification No. 958,856 discloses copolymers suitable for use in coating compositions which are derived from (1) esters of acrylic or methacrylic acid; (2) a methylol compound; and (3) a mixed ester of a diol esterified with (meth)acrylic acid and an organic or inorganic acid (such as phosphoric acid).

U.S. Pat. No. 3,449,303 discloses polymers of phosphate esters derived from allyloxy and allyloxyalkoxy phosphates and having improved dyeability.

U.S. Pat. No. 4,110,285 discloses a process for preparing a stable aqueous emulsion of addition polymers using a mixture of phosphate esters as an emulsion stabilizer during the polymerization process.

European patent publication no. 0221498 discloses anticorrosive copolymer emulsion prepared from ethylenically unsaturated monomers and a polymerizable surface-active alkylphosphate monomer.

U.S. Pat. No. 4,477,623 disclosed an improved paint composition comprising; (1) a water-insoluble addition polymer prepared from styrenes, acrylates, methacrylates, vinyl esters and vinyl chloride (including at least one monomer containing a phosphoric, sulphonic or carboxylic acid group (2) anionic or non-ionic emulsifier, (3) polyoxyethylene-chain-containing compound and (4) alkali-soluble addition polymer.

U.S. Pat. No. 4,506,057 discloses a modified latex composition comprising at least one ethylenically unsaturated monomer and a compound having a-PO(O)$_2$ group which is bound to the surface of the latex. These compositions may contain various water-insoluble inorganic fillers such as zinc oxide.

Japanese patent disclosure no. 61-143411 discloses an acrylic coating material consisting of a copolymer of 90–99.9 wt. % of copolymerizable monomer and 0.1–10 wt. % of phosphoric acid ester.

U.S. Pat. No. 4,658,003 discloses polymeric compositions comprising the reaction product of 0.5–100% of a (hydroxyl)-phosphinyl-alkyl acrylate or methacrylate and 0–99.5% of a methacrylate and 0–99.5% of a polymerizable 1,2-ethylencially unsaturated compound.

The present invention is an improvement over the prior art compositions of carboxyl or phosphorus-containing polymers. The improvement lies in the combination of one or more polymer(s) containing phosphorus groups and a crosslinking agent comprising one or more water-soluble polyvalent metal compounds. It is an object of this invention to provide coating and adhesive compositions which have improved solvent, chemical, print and corrosion resistance and adhesion to metal. It is a further object of this invention to provide improved phosphorus-containing polymer compositions which contain water-soluble polyvalent metal crosslinking agents instead of water-insoluble metal crosslinkers. It is an even further object of this invention to provide novel polymeric compositions which are curable at ambient temperatures. Further, it is an object of the present invention to provide film-forming polymeric compositions which are stable as a one-container system without the necessity of premixing of ingredients immediately prior to use.

SUMMARY OF THE INVENTION

This invention relates to improved polymer compositions comprising in combination (a) one or more polymer(s) containing pendant and/or terminal phosphorus groups(s) and (b) one or more water-soluble polyvalent metal compounds(s) functioning as a crosslinking agent. The compositions may additionally contain a volatile chelating agent, such as, for example, volatile ammonia, amines, beta-ketoesters, beta-diketones and acetyl acetone. Preferred polyvalent metal compounds include the acetates benzoates, nitrates and carbonates of $Co^{2+}$, $Zn^{2+}$, $Ni^{2+}$ and $Zr^{2+}$. The compositions of the present invention are useful in a variety of coatings and adhesives applications and result in improved solvent resistance, chemical resistance, print resistance, corrosion resistance and adhesion to metal surfaces.

DETAILED DESCRIPTION

The present invention involves novel polymeric compositions which find utility as ambient-curable coatings and adhesives having improved solvent resistance, chemical resistance, print resistance, corrosion resistance and adhesion to metal surfaces. This invention specifically relates to polymeric compositions comprising in combination (a) one or more polymer(s) containing pendant or terminal (or both) phosphorus group(s) and (b) one or more water-soluble polyvalent metal compound(s) functioning as a crosslinking agent.

The polymers which are useful in this invention include homopolymers and copolymers of: (1) vinyl esters of an aliphatic acid having 1 to 18 carbon atoms, such as vinyl acetate; (2) acrylic acid esters and methacrylic acid esters of an alcohol having 1 to 18 carbon atoms, such as for example methyl acrylate, ethyl acrylate, butyl acrylate, 2-ethyl hexyl acrylate, methyl methacrylate, ethyl methacrylate and butyl methacrylate; and (3) mono- and di-ethylencially unsaturated hydrocarbons, such as ethylene, isobutylene, styrene, aliphatic dienes (such as butadiene, isoprene, and chloroprene) and the like. The polymers preferably include copolymers of acrylic or methacrylic acid esters with one or more of the following monomers: vinyl chloride, vinylidene chloride, styrene, vinyltoluene, acrylonitrile, and methacrylonitrile. Suitable polymers also include copolymers of one or more of the above hydrocarbons with one or more nitriles or amides of acrylic acid, methacrylic acid or vinyl esters. The polymers may be used as emulsions, suspensions, or solutions of the polymers in water or organic solvents, preferably as aqueous emulsions. The polymer particles can be single-stage or multi-stage. The present invention is especially suitable for use in acrylic latex type compositions such as described in U.S. Pat. Nos. 4,129,448; 4,102,843; 3,740,366; and 3,736,286, the disclosures of which are herein incorporated by reference. Preferably, the polymers for use in this invention are thermoplastic and have a glass transition temperature from about −50° C. to about 100° C., more preferably 20°-60° C. A suitable concentration of total polymers present in the compositions of this invention ranges from about 30% to about 99% by weight based on the total dry weight of the composition. The concentration of polymers which contain no phosphorus groups can range from about 50% to about 98% by weight based on the total weight of polymers in the composition.

It is critical to the practice of this invention that at least one of the polymers contain pendant and/or terminal phosphorus groups. Suitable phosphorus-group-containing polymers would include the polymers mentioned above which have a molecular weight (measured by gel permeation chromatography) of about 400 or greater and at least two phosphorus groups per molecule. The phosphorus groups can be phosphate, phosphonate or phosphinate. Preferably the phosphorus-group-containing polymer is an acrylic polymer or copolymer having a molecular weight of about 500,000 or greater and from about 4 to about 5 phosphorus groups per molecule. The phosphorus-group-containing polymers can be prepared by reacting the basic polymer and/or corresponding polymerizable monomers with suitable monomers containing phosphate, phosphonate or phosphinate functionality following conventional polymerization processes such as disclosed in U.S. Pat. No. 4,658,003, herein incorporated by reference.

Phosphorus-containing monomers and the preparation thereof are described in U.S. Pat. No. 3,355,364, the disclosure of which is herein incorporated by reference. The preferred monomers for preparing the phosphorus-group-containing polymer are phosphoethylmethacrylate, phospho-di(ethyl methacrylate), and allyl phosphate represented by the formula I, II and III, respectively.

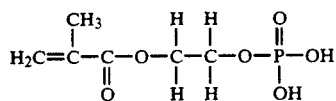
(I)

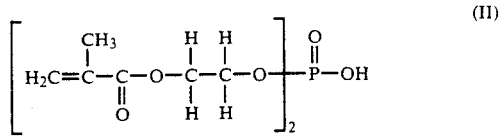
(II)

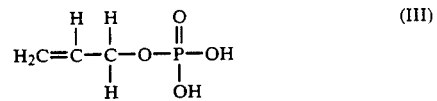
(III)

A suitable level of phosphorus-group-containing polymers for use in the compositions of this invention is from about 2% to about 50% by weight based on the total weight of polymer in the composition. Preferably the phosphorus groups have the formula.

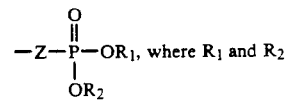, where $R_1$ and $R_2$ independently are H or ($C_1$-$C_{12}$) alkyl or aryl and Z is —O— or —C—.

It is also critical to the practice of this invention that the polymeric compositions contain one or more water-soluble polyvalent metal compounds functioning as crosslinking agents. Suitable polyvalent metals include those such as elements 21 through 30 of the Periodic Table of the Elements. The preferred polyvalent metal compounds include the metal acetates, benzoates, nitrates, carbonates and the like, although any water-soluble polyvalent metal compound would be suitable for use in this invention. A suitable level of polyvalent metal for this invention ranges from about 1:4 to about 2:1 polyvalent metal to phosphorus-groups. Preferably the molecular ratio of polyvalent metal to phosphorus-groups ranges from about 1:2 to about 2:1.

The compositions of this invention may also include a volatile chelating agent which functions to block the polyvalent metal while in solution. This prevents premature crosslinking of the metal with the polymer-bound phosphorus-groups until the volatile chelating agent has evaporated. Thus, the invention produces coatings and adhesives compositions which exhibits long-term storage stability in a one container system, and which are curable at ambient temperature by air drying. Suitable, volatile chelating agents include, for example, ammonia; amines, such as morpholine, monoethanolamine, diethylamino ethanol, triethylamine and triethanol amine; β-diketones; and β-ketoesters. The β-diketones are represented by the formula:

where R is —H, lower alkyl or aryl; and Y and Y' independently are aryl or —CXX'B where X and X' independently are —H or halogen and B is —H, halogen or lower alkyl. Suitable β-diketones include, for example, 2,4-pentanedione, 2,4-hexanedione, 2,4-heptanedione, 5-methyl-2, 4-hexanedione, 5,5-dimethyl-2, 4-hexanedione, 3-methyl-2, 4-pentanedione, 1,1,1-trifluoro-2, 4-pentanedione, 3-benzyl, 2,4-pentanedione and the like. The β-ketoesters can be represented by the formula:

where Y, Y' and R are as defined above.

Suitable β-ketoesters include, for example, methyl acetoacetate, ethylacetoacetate, alpha-methyl-ethyl acetoacetate, alpha-n-butyl ethyl acetoacetate, alpha-sec-butyl alpha-ethylethyl acetoacetate and the like. The volatile chelating agents are used at a level of at least 2 moles of chelating agent per mole of metal, preferably at a molar excess of chelating agent to metal.

The compositions of this invention preferably contain a solvent which comprises from about 40% to about 80% by weight of the total composition. Suitable solvents include water and organic solvents such as alcohols, glycol ethers, aromatics, ketones, acetates. These include, for example, methanol, ethanol, toluene, xylene, acetone, methyl ethyl ketone, butyl acetate and the like. Most preferably the compositions of this invention are aqueous emulsions.

The compositions optionally may include other traditional additives for coatings and adhesives, such as thickeners, pigments, stabilizers and the like, provided that these do not interfere with the crosslinking of the polyvalent metal with the phosphorus groups. The amount of these optional additives can be determined by methods known in the art, but are preferably less than 70% by weight of the total solids content of the compositions.

The compositions are prepared by blending the ingredients to obtain a homogeneous mixture. The polyvalent metal is preferably added as an aqueous solution with a pH of about 9-10. The phosphorus-group-containing polymer(s) can be cold blended into the compositions without the necessity of grafting these polymers onto the other polymers in the composition. It is believed that the cured composition forms an interpenetrating polymer network resulting from polyvalent metal and phosphorus group crosslinking and chain entanglement. The compositions can be applied to a substrate by a variety of techniques such as brushing, spraying, dipping or rolling. They can be air-dried and cured at ambient temperatures from about 5° C. or higher to obtain films with dramatically improved performance properties. The compositions of this invention are useful in a variety of applications such as paints, coatings, adhesives, caulks and mastics.

The following examples are presented to demonstrate this invention. The examples are intended to be illustrative and not limitative. All parts and percentages are by weight unless otherwise indicated.

EXAMPLE I

A phosphorus-group-containing polymer within the scope of this invention was prepared by the following procedure:

A 3 liter, 4-necked, round-bottom flask with a blade stirrer, condenser, nitrogen inlet, thermometer and inlets for adding monomer emulsion and initiator solution was charged with 690 g. deionized water and 3.3 g. soap (Siponate DS-4; 23% active). This solution was heated to 80° C. under a flow of nitrogen.

A monomer emulsion was prepared by adding 577.2 g. butyl acrylate and 490.6 g. methyl methacrylate to a solution of 16.4 g. soap (Siponate DS-4) in 603 g. of deionized water. A portion (101 g.) of the monomer emulsion was reserved to make a preform seed and 42.2 g. of phosphoethyl methacrylate (Kayamer PM-1 available from Nippon Kayaku Co., Ltd.) was added to the remainder of the monomer emulsion.

The 101 g. of reserved monomer emulsion above was added to the reaction flask, followed by a solution of 3.12 g. ammonium persulfate dissolved in 23 g. deionized water. The reaction mixture was allowed to polymerize for 5 minutes and the temperature was maintained at 80° C. The remaining portion of the monomer emulsion and an initiator solution of 0.56 g. ammonium persulfate in 60 g. deionized water were added separately and uniformly over 180 minutes while maintaining a reaction temperature of 80° C. At the conclusion of the feeds of monomer emulsion and initiator solution, the reaction was maintained at 80° C. for 30 minutes and then cooled to 55° C. The reaction was finished-off by adding 11.1 g. of an 0.15% aqueous solution of $FeSO_4 \cdot 7H_2O$, 0.32 g. t-butyl hydroperoxide in 19 g. deionized water and 0.14 g. sodium sulfoxylate formaldehyde in 19 g. deionized water and maintaining temperature of 80° C. for 20 minutes. The final product was cooled and filtered through a 100 mesh screen.

The resulting phosphorus-group-containing latex had a composition by weight of 52% butyl acrylate, 44.2% methyl methacrylate and 3.8% phosphoethyl methacrylate. This latex had a total solids of 42.2%, viscosity of 16 centipoise and particle size of 155 nanometers.

EXAMPLE II

A phosphorus-containing polymer within the scope of this invention was prepared by the following procedure:

A 3-liter, 4-necked, round-bottom flask with a stirrer, condenser, nitrogen inlet, thermometer and inlets for adding monomer emulsion and initiator/buffer solution was charged with 916 g. deionized water and 12.0 g of soap (Alipal CO-436, 58% active). This solution was heated to 80° C. under a flow of nitrogen.

A monomer emulsion was prepared by adding 516.4 g. of butyl acrylate, 473.1 g. of methyl methacrylate, 26.4 g. of methacrylic acid and 40.1 g. of phosphoethyl methacrylate to a solution of 6.2 g. of soap in 264 g. of deionized water.

A portion (90.5 g.) of the monomer emulsion was added to the reaction flask followed by a solution of 2.1 g. ammonium persulfate dissolved in 37.7 g. deionized water. The reaction mixture was allowed to polymerize for about 20 to 30 minutes. Then the remaining portion of the monomer emulsion and an initiator/buffer solution of 0.75 g. of ammonium persulfate dissolved in 256 g. of deionized water containing 6.8 g. of ammonia (28%) were added separately and uniformly over 150 minutes while maintaining a reaction temperature of 80° C. At the conclusion of the feed of the monomer emulsion and initiator/buffer solution the reaction was maintained at 80° C. for an additional 30 minutes and then cooled to 70° C.

The reaction was finished-off by adding 10.6 g. of an 0.15% aqueous solution of $FeSO_4 \cdot 7H_2O$, 1.5 g. t-butyl hydroperoxide (70%) in 37.7 g. of deionized water and 1.06 g. of sodium sulfoxylate formaldehyde in 37.7 g. of deionized water and maintaining a temperature of 70° C. for 30 minutes.

The final product was cooled and filtered through a 100 mesh screen. The resulting phosphorus-group-containing latex had a composition by weight of 48.9% butyl acrylate, 44.8% methyl methacrylate, 2.5% methacrylic acid and 3.8% phosphoethyl methacrylate. The latex had a total solids of 39.8%, viscosity of 18 centipoise and average particle size of 106 monometers.

EXAMPLE III

A phosphorus-containing polymer within the scope of this invention was prepared following the procedures of Ex. II, except that the monomers and amounts thereof were altered to give a polymer having the composition by weight of 47.8% butyl acrylate, 43.6% methyl methacrylate and 8.6% phosphoethyl methacrylate. The resulting latex had a total solids of 39.6%, viscosity of 32 centipoise and average particle size of 104 nanometers.

EXAMPLE IV

A phosphorus-containing polymer within the scope of this invention was prepared by the following procedure:

A 5-liter, 4-necked, round-bottom flask with a stirrer, condenser, nitrogen inlet, thermometer and inlets for adding monomer emulsion and initiator solution was charged with 1630 g. deionized water and 18.4 g. of soap.

A monomer emulsion was prepared by adding 710.5 g. of 2-ethylhexyl acrylate, 463.9 g. of styrene, 450 g. of acrylonitrile, 92.3 g. of methacrylic acid and 61.7 g. of phosphoethyl methacrylate to a solution of 57.5 g. of soap in 380 g. of deionized water.

A portion (100 g.) of the monomer emulsion was added to the reaction flask followed by a solution of 3.60 g. ammonium persulfate dissolved in 45 g. deionized water. The flow of nitrogen was stopped and the reaction mixture was allowed to polymerize for 20 minutes. A solution of 3.6 g. of sodium carbonate dissolved in 45 g. of deionized water was added to the flask. Then the remaining portion of the monomer emulsion and an intitiator solution of 0.90 g. of ammonium persulfate dissolved in 120 g. of deionized water containing 3.1 g. of soap were added separately and uniformly over 180 minutes while maintaining a reaction temperature of 80° C. At the conclusion of the feed of the monomer emulsion and initiator solution, the monomer emulsion was rinsed into the flask with 40 g. of deionized water and reaction was maintained at 80° C. for an additional 30 minutes and then cooled to 70° C.

The reaction was finished-off by adding 18.0 g. of an 0.15% aqueous solution of FeSO4.7H20, 2.6 g. t-butyl hydroperoxide (70%) ("t-BHP") in 15 g. of deionized water and 1.8 g. of sodium sulfoxylate formaldehyde in 25 g. of deionized water. After 15 minutes at about 70° C., another charge of the t-BHP solution and sodium sulfoxylate formaldehyde solution was added. After another 15 minutes, 21.6 g. of styrene monomer was added to the kettle and a third charge of a t-BHP solution and sodium sulfoxylate formaldehyde solution was added. The reaction temperature was maintained at about 70° C. for another 15 minutes.

The reaction was then cooled to below 40° C. and neutralized with ammonia (28%). The final product was cooled and filtered through a 100 mesh screen. The resulting polymer had a composition by weight of 39.47% ethylhexyl acrylate, 26.97% styrene, 25.0% acrylonitrile, 5.13% methacrylic acid and 3.43% phosphoethyl methacrylate. The resulting latex had a total solids of 41.7%, average particle size of 105 nanometers and viscosity of 1668 centipoise.

EXAMPLE V

A phosphorus-containing polymer within the scope of this invention was prepared following the procedures of Ex. II, except that the monomers and amounts thereof were altered to give a polymer having a composition by weight of 48.4% butyl acrylate, 44.4% methyl methacrylate, 1.5% methacrylic acid and 5.7% phosphoethyl methacrylate. The resulting latex had a total solids of 40.0%, viscosity of 20 centipoise and average particle size of 113 nanometers.

EXAMPLE VI (COMPARATIVE)

An acrylic polymer containing no phosphorus groups was prepared following the procedures of Example II. The monomers and amounts thereof were altered to give a polymer having a final composition by weight of 49.8% of butyl acrylate, 45.7% methyl methacrylate, and 4.5% methacrylic acid. The resulting latex had a total solids of 40.7%, viscosity of 26 centipoise and average particle size of 102 nanometers.

EXAMPLE VII

The phosphorus-group-containing polymer composition of Example III was mixed with a zinc ammonium carbonate solution to give a mixture containing 0.67% zinc based on total weight of the polymer compositions (1.9% Zn based on solid weight of polymer. This mixture was then evaluated for properties of film formation, storage stability, solvent and chemical resistance and print resistance. Film formation was tested by casting said composition on Bonderite ® 1000 steel panels to give a dry film thickness of about 1.2 mils. The panels were dried at 150° F. for 30 minutes and allowed to stand at room temperature for 7 days. The films were visually examined for continuous film formation and appearance.

Solvent resistance was measured following standard ASTM test method and using dimethylformamide solvent. Poor solvent resistance is indicated by a sample which dissolves or has a relatively high swell ratio. Print and block resistance were measured using standard test procedures and rated on a scale of 0 to 5, with 0=good and 5=poor.

Methyl ethyl ketone solvent rub resistance was measured following standard test procedures and rated according to the number of rubs before the polymer film is visibly affected by the solvent.

Chemical salt resistance was measured by subjecting the panels to a salt spray for 72 hours. The films were visually examined and rated (10=good, 0-poor).

Storage stability was measured by allowing samples of the zinc-containing polymeric mixture to stand at 140° F. for 10 days. The sample were then physically examined and measured for viscosity. The samples were rated as FAIL if there were any gel formation and greater than ten-fold increase in viscosity.

EXAMPLE VIII (COMPARATIVE)

The polymer composition prepared in Ex. 1 was tested for film formation, storage stability, solvent and chemical resistance and print resistance following the procedures of Ex. VII, except that no zinc ammonium carbonate was added to the composition. The results of these tests are presented in Table I (infra).

EXAMPLE IX (COMPARATIVE)

The polymer composition prepared in Ex. VI was tested as in Ex. VII, except that no zinc ammonium carbonate was added to the composition. The results are presented in Table I (infra).

TABLE I

| | Sample: | | |
|---|---|---|---|
| | Ex. VII | Ex. VIII (comparative) | Ex. IX (comparative) |
| Test: | | | |
| Film Formation | yes | yes | yes |
| Stability | pass | pass | pass |
| Solvent Resistance (swell ratio) | 3.9 | dissolved | dissolved |
| Solvent Resistance (MEK rubs) | >200 | 30 | 15 |
| Print Resistance | 2 | 4 | 5 |
| Block Resistance | 1 | 5 | 5 |
| Salt spray | 9.5 | 4.5 | 3 |

The above results demonstrate that the composition of this invention(Ex. VII) has improved solvent resistance, print resistance, block resistance and chemical resistance while maintaining good film formation and storage stability.

EXAMPLE X

The polymer composition prepared in Ex. I was mixed with insoluble, solid zinc oxide pigment at a weight ratio of polymer composition to zinc oxide of 60:40. The mixture was evaluated for film formation following the procedure of Ex. VII. No film formed from the mixture and only a dry powder resulted. The composition was also tested for storage stability and rated as FAIL because complete gelation occurred.

EXAMPLE XI

The polymer composition prepared in Ex. VI was mixed wiht a zinc ammonium carbonate solution to give a mixture containing 0.67% zinc (1.9% Zn based on solid wt. of polymer). The composition was tested for storage stability as in Ex. VII and was rated as FAIL. The composition was also tested for solvent resistance as in Ex. VII and completely dissolved in dimethylformamide.

EXAMPLE XII

The polymer composition prepared in Ex. V was mixed respectively with a variety of water-soluble, polyvalent metal solutions to form compositions within the scope of this invention. A control sample was also prepared containing none of the metal solutions. The samples were formulated according to the following recipe:

| | Sample: (grams) | | | |
|---|---|---|---|---|
| | A | B | C | D (control) |
| Ingredients: | | | | |
| Polymer composition (40% solids) | 62.5 | 62.5 | 62.5 | 62.5 |
| ZnCO$_3$.4NH$_3$ (8.2% Zn) | 5.82 | — | — | — |
| ZrCO$_3$.4NH$_3$ (17% Zr) | — | 3.91 | — | — |
| NiCO$_3$ (81.2% solids) | — | — | 1.07 | — |
| NH$_4$OH (14%) | 1.5 | 2.5 | 3.9 | 2.5 |
| butyl carbitol* | 5.0 | 5.0 | 5.0 | 5.0 |
| Thickener | 2.5 | 1.0 | 1.0 | 1.0 |

*diethylene glycol monobutyl ether

These samples were tested for solvent resistance as in Ex. VII. The results are presented below:

| | Sample: | | | |
|---|---|---|---|---|
| | A | B | C | D |
| MEK rubs | >200 | >200 | >200 | 15 |
| Swell Ratio: | | | | |
| (tetrahydrofuran) | 5.4 | 4.1 | 4.9 | gelled |
| (dimethyl formamide) | 4.5 | 2.7 | 4.1 | dissolved |

I claim:
1. A polymer compostion which dries to an aqueous salt spray resistant coating comprising in combination a) one or more aqueous emulsion polymer(s) containing pendant and/or terminal phosphorus group(s) and b) one or more water-soluble polyvalent metal compound(s) functioning as a crosslinking agent.
2. A composition of claim 1 wherein said polymer (a) comprises about 2% to about 50% by weight based on the total weight of polymer in said composition.
3. A composition of claim 1 wherein the molecular ratio of said polyvalent metal to said phosphorus group(s) ranges from about 1:4 to about 2:1.
4. A composition of claim 1 wherein said phosphorus group(s) have the formula:

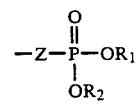

where R$_1$ and R$_2$ independently are H or (C$_1$-C$_{12}$) alkyl or aryl and Z is —O— or —C—.
5. A composition of claim 1 wherein said polyvalent metal is selected from the group consisting of Co$^{2+}$, Zn$^{2+}$, Ni$^{2+}$ and Zr$^{2+}$.
6. A composition of claim 5 wherein said polyvalent metal compound is selected from the group consisting of acetates, benzoates, nitrates, and carbonates.
7. A composition of claim 1 wherein said polymer (a) is polymerized from acrylate or methacrylate monomers.
8. A composition of claim 7 wherein said monomers contain phosphoethyl methacrylate.
9. A composition of claims 7 wherein said monomers contain allyl phosphate.
10. A composition of claim 1 additionally containing a volatile chelating agent.
11. A composition of claim 10 wherein said volatile chelating agent is selected from the group consisting of volatile ammonia, amines, beta-ketoesters beta-diketones, and acetyl acetone.

* * * * *